(12) United States Patent
Tenny

(10) Patent No.: US 12,156,090 B2
(45) Date of Patent: Nov. 26, 2024

(54) TRANSPORT PROTOCOL SELECTION BETWEEN A USER EQUIPMENT AND A DISTRIBUTED LOCATION FUNCTION

(71) Applicant: MediaTek Singapore Pte. Ltd., Singapore (SG)

(72) Inventor: Nathan Edward Tenny, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 438 days.

(21) Appl. No.: 17/424,006

(22) PCT Filed: Feb. 3, 2020

(86) PCT No.: PCT/US2020/016334
§ 371 (c)(1),
(2) Date: Jul. 19, 2021

(87) PCT Pub. No.: WO2020/167506
PCT Pub. Date: Aug. 20, 2020

(65) Prior Publication Data
US 2022/0095075 A1    Mar. 24, 2022

Related U.S. Application Data

(60) Provisional application No. 62/804,860, filed on Feb. 13, 2019.

(51) Int. Cl.
*H04W 4/02* (2018.01)
*H04W 80/06* (2009.01)

(52) U.S. Cl.
CPC .............. *H04W 4/02* (2013.01); *H04W 80/06* (2013.01)

(58) Field of Classification Search
CPC ................................ H04W 4/02; H04W 80/06
See application file for complete search history.

(56) References Cited

U.S. PATENT DOCUMENTS

2003/0093799 A1   5/2003   Kauffman et al.
2003/0172164 A1   9/2003   Coughlin
(Continued)

FOREIGN PATENT DOCUMENTS

CN        109246811 A      1/2019
WO    WO 2015/020508 A1   2/2015
(Continued)

OTHER PUBLICATIONS

Ericsson Vodafone, "Transmission of RRC messages", 3GPP TSG-RAN WG3 #96, R3-171726, 2017, pp. 1-3.
(Continued)

*Primary Examiner* — Barry W Taylor
(74) *Attorney, Agent, or Firm* — Andy M. Han; Han IP PLLC

(57) ABSTRACT

A method of positioning in a wireless communication system is described. The method can include transmitting from a user equipment (UE) a first message of a communication protocol carried with a first transport protocol, receiving by the UE a second message of the communication protocol carried with a second transport protocol different from the first transport protocol, and transmitting by the UE a third message of the communication protocol using the second transport protocol.

15 Claims, 5 Drawing Sheets

(56) References Cited

U.S. PATENT DOCUMENTS

| | | | |
|---|---|---|---|
| 2010/0041418 A1* | 2/2010 | Edge | H04W 64/00 |
| | | | 455/456.2 |
| 2011/0013589 A1* | 1/2011 | Wu | H04W 72/56 |
| | | | 714/E11.131 |
| 2011/0143771 A1* | 6/2011 | Edge | H04L 67/52 |
| | | | 455/456.1 |
| 2011/0212733 A1* | 9/2011 | Edge | H04W 8/22 |
| | | | 455/466 |
| 2017/0251502 A1* | 8/2017 | Wachter | H04W 64/003 |
| 2017/0279899 A1 | 9/2017 | Jain et al. | |
| 2017/0353429 A1 | 12/2017 | Le Rouzic et al. | |
| 2018/0227873 A1 | 8/2018 | Vrzic et al. | |
| 2020/0084569 A1* | 3/2020 | Jain | H04W 4/02 |
| 2021/0274459 A1* | 9/2021 | Wang | H04W 12/02 |
| 2022/0150809 A1* | 5/2022 | Guo | H04W 48/18 |

FOREIGN PATENT DOCUMENTS

| | | |
|---|---|---|
| WO | WO 2017/137076 A1 | 8/2017 |
| WO | WO 2018/141181 A1 | 8/2018 |

OTHER PUBLICATIONS

Vodafone Group Services Ltd, "High Layer Functional Spilt with Separated Control and User Planes", R3-171203, 3GPP TSG-RAN WG3 #95bis, 2017, pp. 1-10.

Vodafone GmbH, "Evolved LTE RAN Architecture", R3-172668, 3GPP TSG-RAN WG3 97, 2017, pp. 1-8.

3GPP TS 36.401 V9.21.0 (2010-063), "3rd Generation Partnership Project; Technical Specification Group Radio Access Network; Evolved Universal Terrestrial Radio Access Network (E-UTRAN); Architecture description (Release 9)", 2010, pp. 1-21.

International Search Report and Written Opinion issued on May 7, 2020 in PCT/US2020/016334 filed on Feb. 3, 2020.

Combined Chinese Office Action and Search Report issued Oct. 21, 2022, in corresponding Chinese Patent Application No. 202080006740.X (with English Translation of Category of Cited Documents), 9 pages.

* cited by examiner

TRANSPORT PROTOCOL SELECTION BETWEEN A USER EQUIPMENT AND A DISTRIBUTED LOCATION FUNCTION

INCORPORATION BY REFERENCE

This present application claims the benefit of U.S. Provisional Application No. 62/804,860, "Transaction Management and Protocol Selection between a User Equipment and a Distributed Location Function" filed on Feb. 13, 2019, which is incorporated herein by reference in its entirety.

TECHNICAL FIELD

The present disclosure relates to wireless communications, and specifically relates to mobile positioning technologies.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Mobile network based positioning technologies can be employed to determine geographic locations of mobile devices, which provides the basis for various location based services. For example, in response to a location request, a location session between a target mobile device and a location server residing in a mobile communication system may be initiated. The target device can obtain assistance data from the location server, and, based on the assistance data, measure signals transmitted from a reference source (e.g., a base station, or a global navigation satellite system) in order to determine a location of the target device. Resulting measurements or a location estimate can be transmitted to the location server that may subsequently report the location of the target device to a client making the location request.

SUMMARY

Aspects of the disclosure provide a method of positioning in a wireless communication system. The method can include transmitting from a user equipment (UE) a first message of a communication protocol carried with a first transport protocol, receiving by the UE a second message of the communication protocol carried with a second transport protocol different from the first transport protocol, and transmitting by the UE a third message of the communication protocol using the second transport protocol.

An embodiment of the method can further include determining the first and second messages of the communication protocol are associated with a same session of the communication protocol. In an example, the third message of the communication protocol is associated with the same session of the communication protocol as the first and second messages of the communication protocol. In an embodiment, the first message and the second message of the communication protocol include a same transaction identifier (ID). In an embodiment, a message of the first transport protocol carrying the first message and a message of the second transport protocol carrying the second message of the communication protocol each carry information indicating a same session of the communication protocol.

In an embodiment, the first transport protocol is a non-access-stratum (NAS) protocol between the UE and a core network element, and the second transport protocol is a radio resource control (RRC) protocol between the UE and a base station. In an embodiment, the communication protocol is a positioning protocol between the UE and a location server. An embodiment of the method can further include receiving by the UE a fourth message of the communication protocol carried with the first transport protocol, and transmitting by the UE a fifth message of the communication protocol using the first transport protocol.

Aspects of the disclosure provide an apparatus of positioning in a wireless communication system. The apparatus can include circuitry configured to transmit a first message of a communication protocol carried with a first transport protocol, receive a second message of the communication protocol carried with a second transport protocol different from the first transport protocol, and transmit a third message of the communication protocol using the second transport protocol.

Aspects of the disclosure provide a non-transitory computer-readable medium storing instructions that, when executed by a processor, cause the processor to perform the method of positioning in the wireless communication system.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a method of selecting transport protocols for carrying messages of a overlying communication protocol (e.g., a positioning protocol) terminated between a user equipment (UE) and a network function (e.g., a location server). For example, a location function may be distributed in a wireless network (e.g., hosted by one or multiple base stations). An entity responsible for such distributed location functionality may be referred to as a distributed location function (DLF), a location management component (LMC), a distributed location management function (LMFd), and so on. The UE may initiate a session of the positioning protocol by sending a first message of the positioning protocol to a core network node. The first message may be carried using a first transport protocol (e.g., a non-access-stratum (NAS) protocol).

In response to receiving the first message, the core network node may select a location function hosted in a base station close to the UE to serve as a location server. The selected location function may then send a second message of the positioning protocol to the UE using a second transport protocol (e.g., a radio resource control (RRC) protocol) for carrying the second message. While receiving the second message, the UE can determine the second message is associated with the first message, and the underlying transport protocol for delivering the messages has been switched. Accordingly, the UE may continue the session using the most recently used second transport protocol to communicate with the selected location function hosted in the nearby base station.

Figure 1:
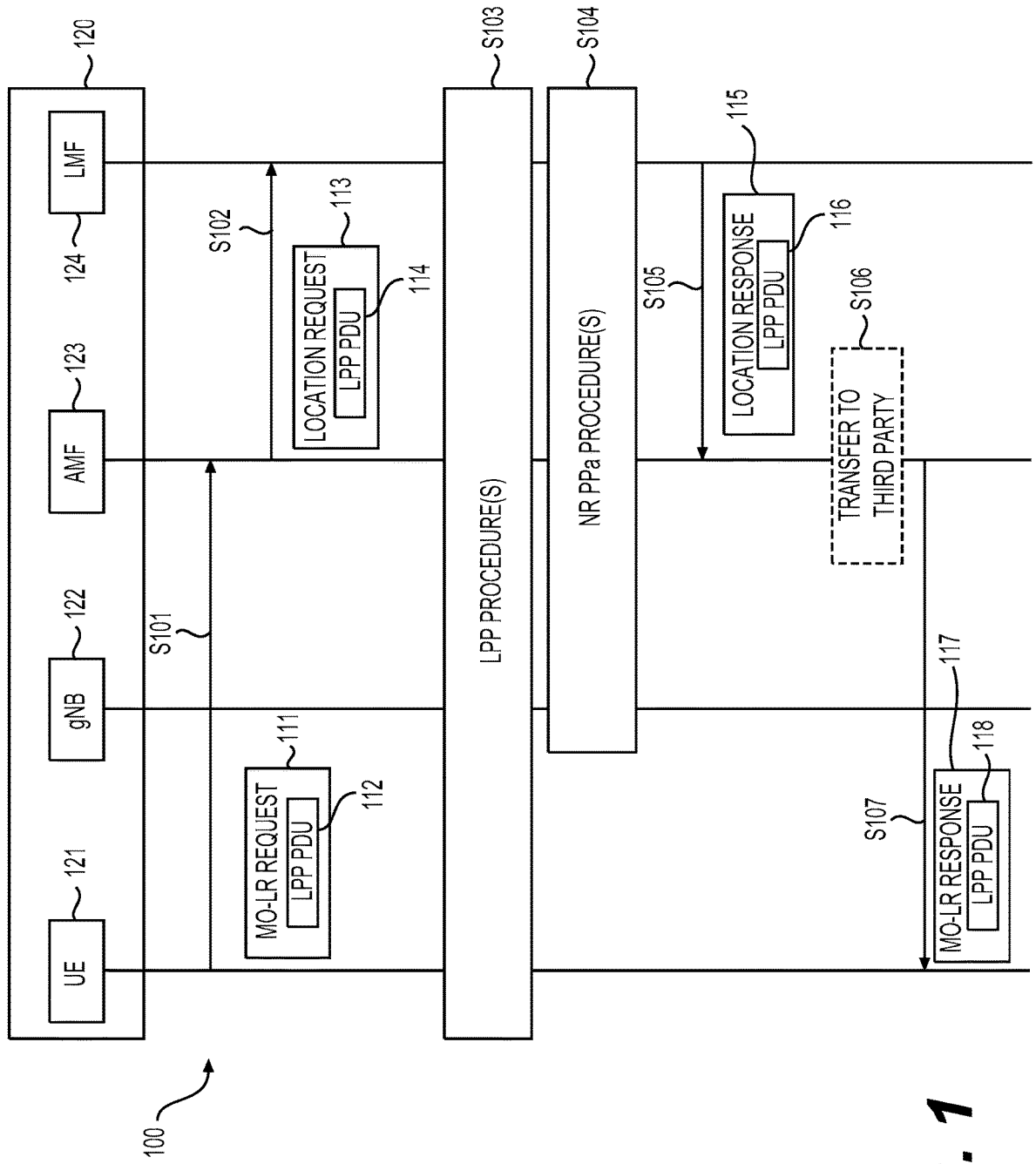
FIG. 1 shows an example positioning process 100 in a wireless communication system 120.

FIG. 1 shows an example positioning process 100 in a wireless communication system 120. The system 120 can be a fifth generation (5G) system. The system 120 can include a UE 121, a gNB 122, an access and mobility management function (AMF) 123, and a location management function (LMF) 124. The elements in the system 120 can operate as specified in the 3rd Generation Partnership Project (3GPP) 5G standards.

For example, the UE 121 can be a mobile phone, a computer, or a vehicle. The UE 121 and the gNB 122 can communicate based on a New Radio (NR) air interface. The AMF 123 and LMF 124 can be part of a core network of the system 120, while the gNB 122 can be part of a radio access network (RAN) of the system 120. The core network may include other network functions not shown in FIG. 1. The AMF 123 can interact with the UE 121 and the gNB 122 to perform connection and mobility management tasks. In addition, the AMF 123 can serve as an entry point of the core network for transferring control plane signaling messages between the core network and the gNB 122 or the UE 121.

The process 100 can be performed based on a positioning protocol, such as the Long Term Evolution (LTE) Positioning Protocol (LPP) defined in 3GPP TS 36.355 and 3GPP TS 37.355. Generally, an LPP session can be established between a location server and a target device in order to obtain location related measurements or a location estimate, or to transfer assistance data. A single LPP session is used to support a single location request, such as a mobile terminated location request (MT-LR), a mobile originated location request (MO-LR) or a network initiated location request (NI-LR). Multiple LPP sessions can be used between the same endpoints to support multiple different location requests. Each LPP session can comprise one or more LPP transactions, with each LPP transaction performing a single operation (e.g., capability exchange, assistance data transfer, or location information transfer).

The LPP transactions can be realized as LPP procedures. The instigator of an LPP session can instigate the first LPP transaction, but subsequent transactions may be instigated by either end. LPP transactions within a session may occur serially or in parallel. LPP transactions are indicated at the LPP protocol level with a transaction identifier (ID) in order to associate messages with one another (e.g., request and response). For example, LPP messages within a transaction are linked by a common transaction ID.

For example, an LPP session can be established for exchanging LPP messages between the UE 121 and the LMF 124. The LMF 124 can perform tasks of a positioning server, such as maintaining and providing to the UE 121 assistance data for location-related measurements, computing a position estimate of the UE 121 based on the location-related measurements, and the like. The UE 121 can measure radio signals transmitted from surrounding base stations or other sources (for example, satellites, terrestrial beacon systems, and so on) based on the assistance data, and provide resulting measurements or a position estimate to the LMF 124.

In the FIG. 1 example, the process 100 is performed based on a centralized positioning architecture. For example, positioning server functions are centralized in the LMF 124 that resides within the core network. In contrast, in other UE positioning examples, a distributed positioning architecture may be adopted. For example, some or all of the functions of the LMF 124 can be distributed in multiple base stations (e.g., gNBs) in a RAN. This distributed architecture allows for lower-latency positioning operations (since messages only need to travel between a UE and the RAN, avoiding the latency of communication with the core network), and may also scale to support large numbers of UEs more easily than the centralized architecture (since the location function in each gNB only needs to support UEs in the service area of the gNB itself, as opposed to a centralized LMF which needs to support the number of UEs served by many gNBs).

In the centralized architecture shown in FIG. 1, LPP messages are sent to and from the UE 121 using a non-access stratum (NAS) protocol as transport. For example, in the uplink direction, the UE 121 sends an UL NAS TRANSPORT message to the AMF 123 with an LPP message encapsulated as an LPP protocol data unit (PDU) within a payload container field of the UL NAS TRANSPORT message. In the downlink direction, the AMF 123 sends a DL NAS TRANSPORT message to the UE with an LPP message encapsulated as an LPP PDU within a payload container field of the DL NAS TRANSPORT message. Transport between the AMF 123 and the LMF 124 is handled by a so-called NLs interface, which operates transparently to the UE 121 and is used as bidirectional transport to carry LPP messages.

As an example, the process 100 can be an MO-LR procedure. During the process 100, the UE 121 may initiate a location session by transmitting an LPP PDU for delivery to the location server (the LMF 124). The process 100 can include steps from S101 to S107.

At S101, the UE 121 can send an MO-LR request 111 at a NAS protocol layer to the AMF 124. The NAS protocol layer can be terminated between the UE 121 and the AMF 123. The MO-LR request 111 can be an UL NAS TRANSPORT message carrying an LPP PDU 112.

At S102, in response to receiving the MO-LR request 111, the AMF 123 can select the LMF 124 as the location server, and transmit a location request 113 to the LMF 124 over the NLs interface. The location request 113 may carry an LPP PDU 114 identical to the LPP PDU 112.

At S103, one or more LPP procedures between the UE 121 and the LMF 124 can be triggered by the LPP PDU 114. Typical examples of the LPP procedure triggered in this way include an assistance data exchange (the UE's initial LPP PDU comprises a request for assistance data, such as an LPP Request Assistance Data message), a transfer of UE capabilities (the UE's initial LPP PDU comprises an indication of UE capabilities, such as an LPP Provide Capabilities message), an exchange of positioning information (the UE's initial LPP PDU comprises a request for a position estimate, such as an LPP Request Location Information message), and the like.

At S104, optionally, one or more procedures of NR Positioning Protocol A (NRPPa) terminated between the gNB 122 and the LMF 124 can also be triggered by the LPP PDU 114 to obtain location information from the gNB 122.

At S105, the LMF 124 can transmit a location response 115 to the AMF 123 carrying a final LPP PDU 116. For example, the final LPP PDU 116 may carry a location estimate of the UE 121 computed by the LMF 124. At S106, optionally, the location estimate of the UE 121 can be transferred to a third party if the MO-LR request 111 requests a location transfer.

At S107, the AMF 123 may transmit an MO-LR response 117 in the NAS layer to the UE 121. The MO-LR response 117 can be a DL NAS TRANSPORT message carrying the final LPP PDU 116 (LPP PDU 118) received from the AMF 123. The process 100 can then terminate.

It is noted that the location server selection at S102 is performed by the AMF 123 after the reception of the MO-LR request 111. Thus, the UE 121 does not know what server will be used for the LPP procedure(s) at the time the UE 121 formulates and delivers the LPP PDU 112.

Figure 2:
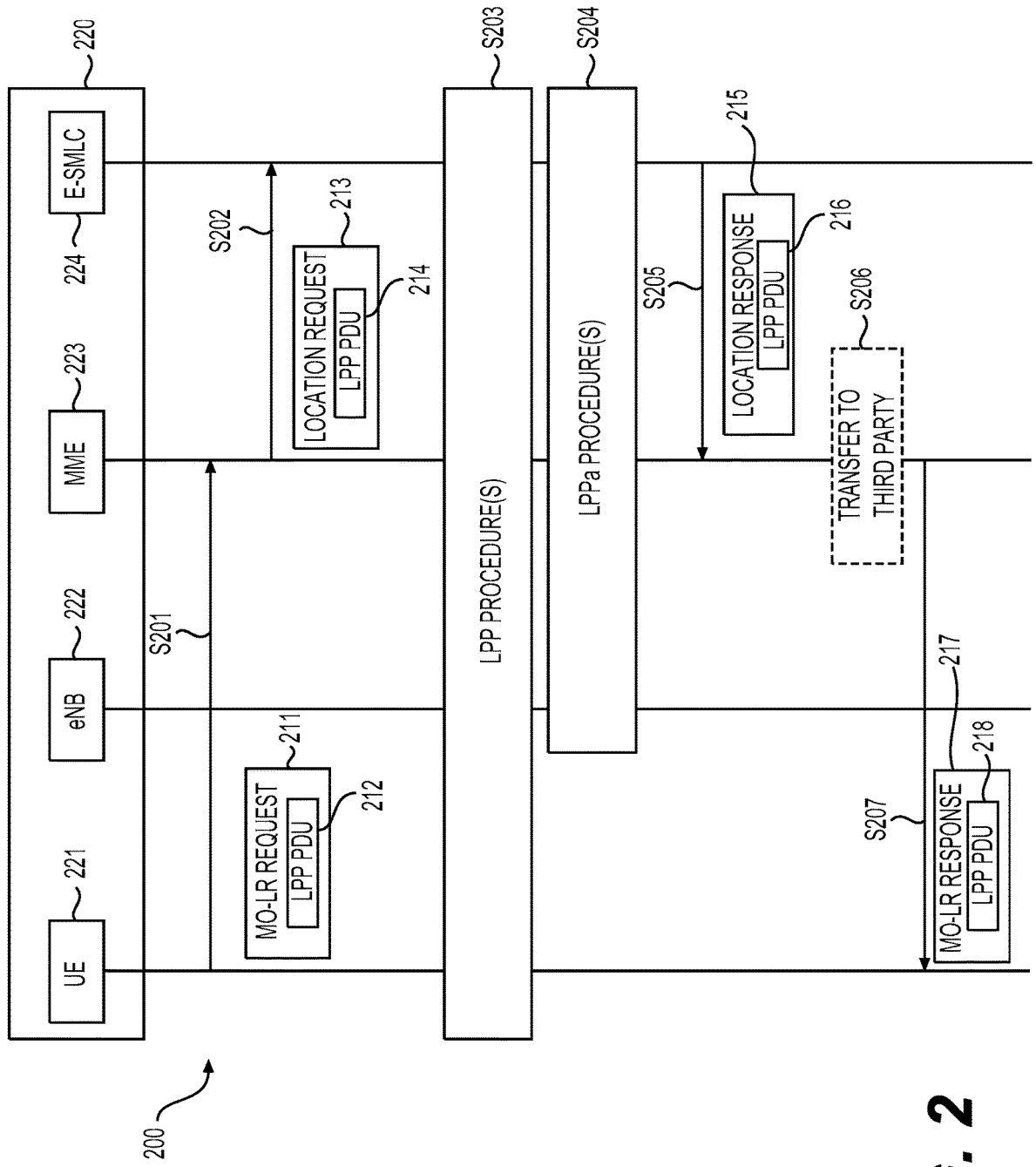
FIG. 2 shows another example positioning process 200 in a wireless communication system 220.

FIG. 2 shows another example positioning process 200 in a wireless communication system 220. The system 220 can be a fourth generation (4G) LTE system. The system 220 can include a UE 221, an eNB 222, a mobility management entity (MME) 223, and an enhanced serving mobile location center (E-SMLC) 224. The elements in the system 220 can operate as specified in 3GPP LTE 4G standards.

Similar to the FIG. 1 example, the process 200 can be performed based on a positioning protocol, such as the LPP. An LPP session can be established for exchanging LPP messages between the UE 221 and the E-SMLC 224. The E-SMLC 224 can perform tasks of a positioning server.

Similar to the FIG. 1 example, the process 200 can be performed based on a centralized positioning architecture. For example, positioning server functions are centralized in the E-SMLC 224 that resides within a core network of the system 220. LPP messages can be exchanged between the UE 221 and the MME 223 using the NAS protocol as transport. Transport between the MME 223 and the E-SMLC 224 can be handled by a so-called SLs interface, which operates transparently to the UE 221 and is used as bidirectional transport to carry LPP messages.

The process 200 can include steps S201-S207 which are similar to the steps S101-S107. The differences between the processes 100 and 200 are that the eNB 222, the MME 223, and the E-SMLC 224 in FIG. 2 operate in place of the gNB 122, the AMF 123, and the LMF 124, respectively, and an LTE Positioning Protocol A (LPPa) is used in place of the NRPPa at S204.

Figure 3:
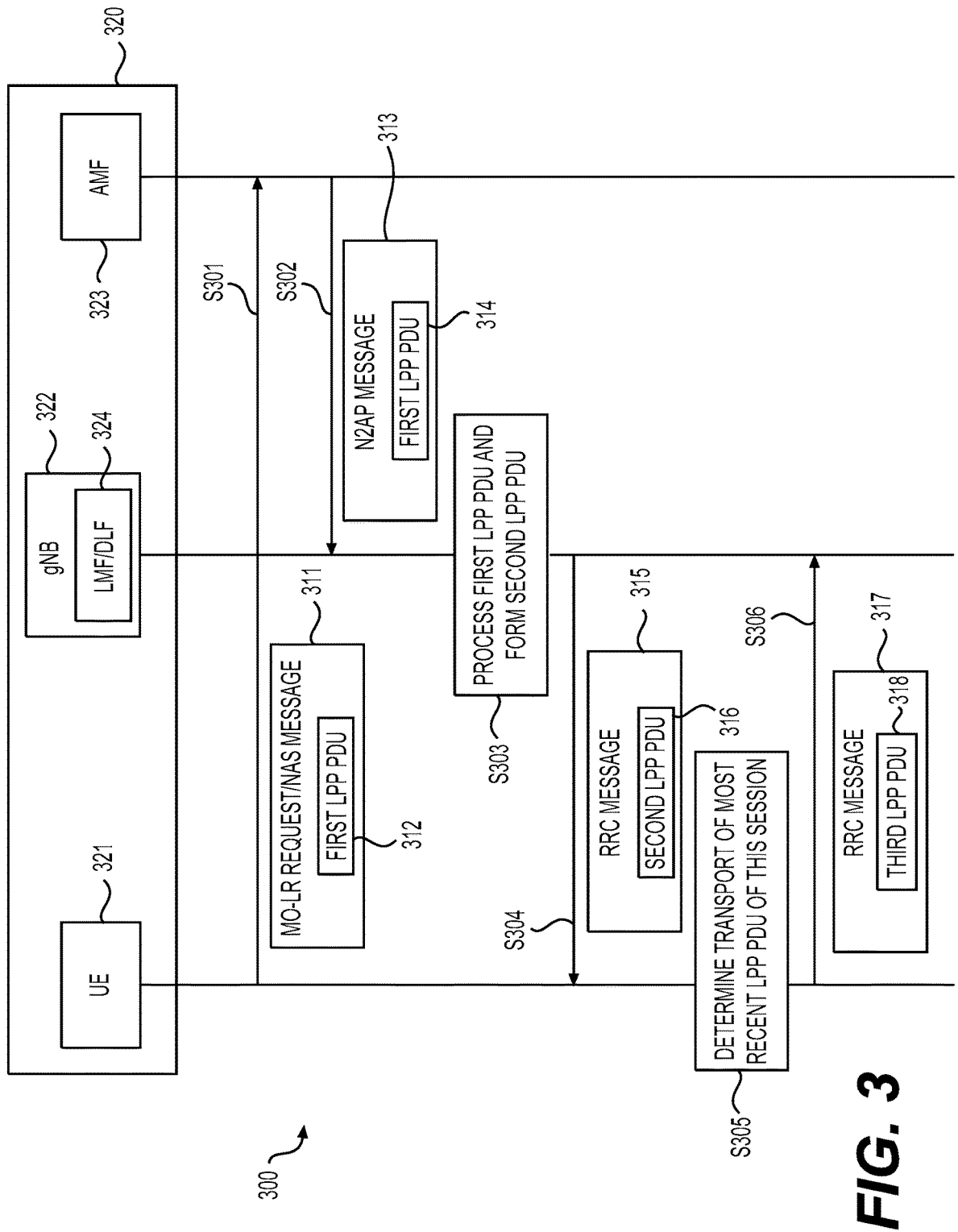
FIG. 3 shows an example positioning process 300 in a wireless communication system 320.

FIG. 3 shows an example positioning process 300 in a wireless communication system 320. The system 320 can be similar to the system 120 in the FIG. 1 example. For example, the system 320 can be a 5G system. The system 320 can include a UE 321, a gNB 322, an AMF 323, and an LMF 324 that have similar functions as the UE 121, the gNB 122, the AMF 123, and the LMF 124, respectively, in the FIG. 1 example.

However, different from the FIG. 1 example, the system 320 can have a distributed positioning architecture. For example, the LMF 324 including some or all of the functions of a central LMF can be hosted in the gNB 322, rather than residing in a core network of the system 320. In some examples, the LMF 324 can be integrated into the gNB 322. In other examples, the LMF 324 can be separate from the gNB 322, but an interface is configured such that the LMF 324 and the gNB 322 can communicate directly via the interface without passing through the AMF 323.

There can be multiple instances of the LMF 324 distributed in different gNBs in a RAN of the system 320. A distributed LMF can be referred to as a distributed location function (DLF). Thus, the LMF 324 is also referred to as DLF 324. As described, this distributed architecture allows for lower-latency positioning operations, and may also scale to support large numbers of UEs more easily than the centralized architecture.

In the distributed positioning architecture, the DLF 324 may be hosted in the gNB 322, meaning that a transport route between the UE 321 and the DLF 324 that passes through the AMF 323 would be topologically unreasonable and would sacrifice much of the latency benefit of the architecture. It is thus desirable to transport LPP messages between the UE 321 and the DLF 324 using a protocol terminated between the UE 321 and the gNB 322, such as an existing RRC protocol specified in 3GPP standards.

For example, DLInformationTransfer and ULInformationTransfer messages of the RRC protocol, which currently are used as transport for NAS signaling between a UE and a gNB in a 5G system as specified in 3GPP standards, could be extended to allow transport of LPP PDUs between the UE and the gNB. For example, when a positioning session takes place between the UE 321 and the DLF 324 located in the gNB 322, the signaling between the UE 321 and the DLF 324 can use LPP as a communication protocol with RRC as the transport layer, as opposed to the operations in the centralized architecture, in which the signaling between a UE and a LMF uses LPP as a communication protocol with NAS as a transport layer.

In the FIG. 3 example, there can be multiple DLFs distributed at one or more base stations (e.g. gNBs) in addition to a centralized LMF in the system 320. The UE 321 generally does not know in advance whether a given positioning procedure will be handled by the centralized LMF or a DLF. In the particular case of an MO-LR, this means that the UE 321 may need to deliver a first LPP PDU to trigger a positioning procedure, without knowing whether the first LPP PDU is destined for a centralized server or a DLF. Accordingly, the UE 321 may not have a basis for determining whether the first LPP PDU should be carried by NAS (as would be expected for a centralized LMF) or by RRC (as would be expected for a DLF). It may be necessary for the MO-LR request to be delivered by a NAS protocol, so that the AMF 323 can take initial decisions on the support of the requested location operation (e.g., determining if the subscription of the UE 321 authorizes it to obtain the requested location information).

However, if the AMF 323 takes such initial decisions and then determines to direct the first LPP PDU to the DLF 324 for subsequent positioning operations, some ambiguous situations arise. First, it is unclear if the DLF 324 should respond to the first LPP PDU by sending a message to the AMF 323 (consistent with the path by which it received the first LPP PDU) or by sending a message directly to the UE 321 (avoiding the latency of signaling through the AMF). Second, if the DLF 324 takes the second option and responds directly to the UE 321, then the UE 321 may receive a second LPP PDU sent by the DLF 324 in correspondence with the first LPP PDU, wherein the second LPP PDU is delivered by an RRC protocol. The UE 321 may then be unable to determine if subsequent LPP PDUs should be sent via NAS or RRC. Aspects of the disclosure provide solutions to resolve these ambiguous situations.

In the FIG. 3 example, the process 300 can include steps from S301 to S306.

At S301, an MO-LR procedure is triggered by an MO-LR Request 311 sent from the UE 321 to the AMF 323. The MO-LR Request 311 may carry a first LPP PDU 312 comprising a first message of the LPP protocol originated by the UE 321 and intended for delivery to a positioning server such as an LMF or a DLF. The first LPP PDU 312 is generated by the UE 321 without knowledge that it will be handled by a DLF (as opposed to an LMF in the CN). The UE 321 delivers the first LPP PDU 312 to the AMF 323 using NAS transport.

At S302, the AMF 323 selects the DLF 324 to handle the positioning operations, and forwards the first LPP PDU 312 (314) to the DLF 324 over the interface (e.g., an N2 interface, or referred to as a next generation control plane (NG-C) interface) between the AMF 323 and the gNB 322 that hosts the DLF 324. The first LPP PDU 314 can be carried using a message 313 of an N2 application protocol (N2AP) as transport. N2AP can also be referred to as next generation application protocol (NGAP). As one example, the first LPP PDU 314 may comprise an LPP Request Assistance Data message, indicating that the UE 321 requests assistance data from the DLF 324. In other examples, the first LPP PDU 314 may comprise a different message of the LPP protocol.

At S303, after receiving the N2AP message 313 carrying the first LPP PDU 314, the DLF 324 processes the first LPP PDU 314 to generate a second LPP PDU 316 that may be either a response to the first LPP PDU 314, or an instigator of a new LPP transaction. In the former case, the first LPP PDU 312 may initiate an LPP transaction, potentially requiring a response from the DLF 324. This response comes in the form of the second LPP PDU 316, comprising a second message of the LPP protocol. As one example, the second LPP PDU 316 may comprise an LPP Provide Assistance Data message, conveying assistance data from the DLF 324 to the UE 321. In other examples, the second LPP PDU 316 may comprise a different message of the LPP protocol.

At S304, the gNB 322 transmits an RRC message 315 to the UE 321 that serves as transport for the second LPP PDU 316. The RRC message 315 may, for example, be a DLInformationTransfer message. The DLF 324 and gNB 322 can cooperate to transmit the RRC message 315 comprising the second LPP PDU 316. For example, the second LPP PDU 316 originates from the DLF 324, while the RRC message 315 originates from the gNB 322. Since the second LPP PDU 316 is originated by a function in a RAN node, it is reasonable for it to be delivered to the UE 321 using RRC as a transport protocol (rather than using NAS as a transport protocol, which would necessitate an indirect route to the UE 321 via the AMF 323).

At S305, the UE 321 determines the second LPP PDU 316 and the first LPP PDU 312 are associated with the same LPP session, and recognizes the transport (e.g., RRC) that is used for the most recent LPP PDU 316 of the current LPP session. In various embodiments, the NAS message 311 at S301 and the RRC message 315 at S304 may carry information indicating the same LPP session. For example, the NAS message 311 or the RRC message 315 may include a field carrying the information (e.g., a session ID, a routing ID, and the like) indicating the same LPP session. Or, the first LPP PDU 312 or the second LPP PDU 316 may include a field carrying information (e.g., a session ID, a transaction ID, and the like) indicating the same LPP session. After determining the second LPP PDU 316 and the first LPP PDU 312 are associated with the same LPP session, the UE 321 can recognize that the underlying transport protocol for carrying LPP messages for the current LPP session has switched.

Two particular cases of the operations at S305 and S306 are described below. In a first case, the second LPP PDU 316 comprises a response to a first LPP transaction initiated by the first LPP PDU 312. This may, for example, be the case when the first LPP PDU 312 comprises an LPP Request Assistance Data message and the second LPP PDU 316 comprises an LPP Provide Assistance Data message. In this case, a first transaction ID contained in the first LPP PDU 312 and a second transaction ID contained in the second LPP PDU 316 can be identical, allowing the UE 321 to associate the second LPP PDU 316 with the first LPP PDU 312. In other words, when the UE 321 receives the second LPP PDU 316, the UE 321 can know that the second LPP PDU 316 comprises a response to the first LPP PDU 312.

Still referring to the first case (in which the second LPP PDU 316 comprises a response to a first LPP transaction initiated by the first LPP PDU 312), the UE 321 may now initiate a second LPP transaction as part of the same positioning session as the first LPP transaction. For example, the second LPP transaction may comprise a request for location information, a request for assistance data, an indication of UE capabilities, or the like. The second LPP transaction is initiated by sending a third LPP PDU 318, but the UE 321 faces the question of how to deliver the third LPP PDU 318: Should the UE 321 use NAS as transport (as the UE 321 did in the case of the first LPP PDU 322) and deliver the third LPP PDU 318 to the AMF 323, or use RRC as transport (as the gNB 322 did in the case of the second LPP PDU 316) and deliver the third LPP PDU 318 to the gNB 322?

To resolve this question, the UE 321 may follow the example of the most recently received LPP PDU, in this case the second LPP PDU 316 (which in this example was received via RRC transport). An applicable heuristic may be that if the most recent LPP PDU of the current session was received by RRC transport, the UE 321 initiates its next transaction (of the same session) by using RRC transport. The result of applying this heuristic is that the UE 321 sends the third LPP PDU 318 via RRC transport to the gNB 322, which can direct the third LPP PDU 318 to the DLF 324 for processing (without depending on additional external messaging, e.g. to or from the AMF 323). This is a desirable result because it avoids the latency and network loading of sending the third LPP PDU 318 to and from the AMF 323 enroute to the DLF 324.

In the first case, in one example, the AMF 323 can determine a routing ID corresponding to the selected DLF 324 based at least in part on information provided by the UE 321 along with the first LPP PDU 312 in the NAS message 311. This routing ID can be used as a session ID for identifying the current session between the UE 321 and the DLF 324. For example, the AMF 323 can include the routing ID into the message 313, and provide the routing ID to the DLF 324. The DLF 324 can then include the routing ID in the RRC message 315, and forward the routing ID to the UE 321. Thereafter, the routing ID can be carried in subsequent RRC messages between the UE 321 and the gNB 322, and serves as the session ID of the current positioning session between the UE 321 and the DLF 324.

In a second case, the second LPP PDU 316 may initiate a second LPP transaction. In other words, the second LPP PDU 316 may not be a response to the first LPP PDU 312, but may instigate a new operation. As one example, if the first LPP PDU 312 or the NAS message 311 comprises a request for location information, the second LPP PDU 316 may comprise a request for the UE capability, a delivery of assistance data, or the like. In this case, the first LPP PDU 312 may contain a first transaction ID and the second LPP PDU 316 may contain a second transaction ID, wherein the values of the first and second transaction IDs are different. However, the first and second LPP PDUs may be associated by sharing a common routing ID (a.k.a. session ID).

The common routing ID may be associated with a positioning session terminated between the UE 321 and the DLF 324. For example, the common routing ID may be determined by the UE 321 based in part on to-be-transmitted content of the MO-LR request 311 (fields in the NAS message 311 or the first LPP PDU 312), or based on other information. The routing ID can be carried in the MO-LR request 311 and delivered to the AMF 323. The AMF 323 can then forward the routing ID to the DLF 324 using the N2AP message 313. Thus, the UE 321 and the DLF 324 can use the routing ID in the subsequent communications of the current positioning session.

In addition, in response to receiving the common routing ID identifying the current session, the AMF 323 may also determine another routing ID corresponding to the DLF 324, and use the routing ID corresponding to the DLF 324 for communications among network functions inside the core network. To serve this purpose, the mapping between the routing ID of the current session and the routing ID identifying the DLF 324 can be stored at the AMF 323.

Still referring to the second case (in which the second LPP PDU 316 initiates a second LPP transaction different from the first LPP transaction), the UE may transmit the third LPP PDU 318. The third LPP PDU 318 may be a response message associated with the second LPP transaction (for example, an indication of UE capability in the case that the second LPP PDU 316 comprises a request for UE capability) or an initiating message of a third LPP transaction (for example, an indication of location information in the case that the second LPP PDU comprises a delivery of assistance data). As in the first case referred to above, the UE 321 faces the question of how to deliver the third LPP PDU 318: via NAS transport to the AMF 323 or via RRC transport to the gNB 322.

Similarly to the first case referred to above, the UE 321 may follow the example of the most recently received LPP PDU in the current session, namely the second LPP PDU 316. Although the third LPP PDU 318 in this case initiates a third LPP transaction different from the second LPP transaction, the UE 321 may assume that the transport protocol used for the second LPP PDU 316 is appropriate for initiating future transactions with the same server, in this case the DLF 324. Thus, in this case, the UE 321 may deliver the third LPP PDU 318 to the gNB 322 (for processing by the DLF 324) using RRC as a transport protocol. As in the first case referred to above, this is a desirable result because it avoids the latency and network loading of sending the third LPP PDU 318 to and from the AMF 323 enroute to the DLF 324.

The first and second cases referred to above result in a common message flow of S305 and S306. At S305, the UE 321 recognizes the transport that is used for the most recent LPP PDU 316 of the current session. The UE 321 may first determine the second LPP PDU 316 is associated with the same positioning session as the first LPP PDU 312 either based on a transaction ID or a routing ID (session ID) carried in the second LPP PDU 316 or the RRC message 315. Then, the UE 321 can determine to use the RRC protocol as transport for transmission of the subsequent LPP message (e.g., third LPP PDU 318).

At S306, the UE 321 generates and sends an RRC message 317 carrying the third LPP PDU 318. In accordance with the outcome of S305, the RRC protocol is used as a transport protocol, so the RRC message 317 comprising the third LPP PDU 318 goes directly from the UE 321 to the gNB 322 (where the third LPP PDU 318 can be routed directly to the DLF 324 for processing).

Figure 4:
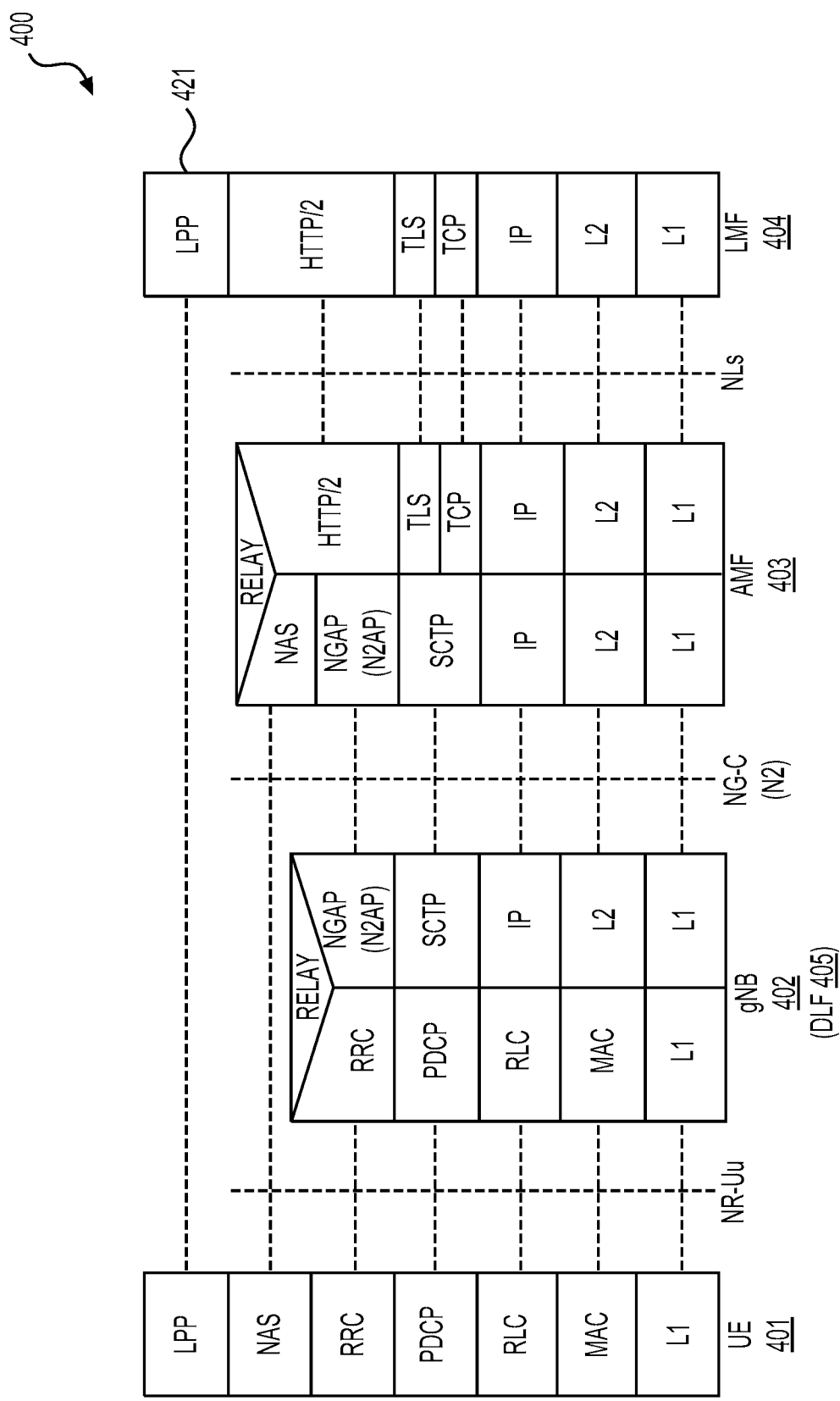
FIG. 4 shows an example of protocol layering 400 to support transfer of LTE Positioning Protocol (LPP) messages between a user equipment (UE) 401 and a location management function (LMF) 404 in a centralized positioning structure.

FIG. 4 shows an example of protocol layering 400 to support transfer of LPP messages between a UE 401 and an LMF 404 in a centralized positioning structure. As shown, an LPP layer 421 is terminated between the UE 401 and the LMF 404, and passes through a gNB 402 and an AMF 403. Three interfaces, NR-Uu, NG-C (or N2), and NLs, exist between the respective elements 401-404.

At the UE 401, the protocol layering 400 includes the following protocol layers: LPP, NAS, RRC, packet data convergence protocol (PDCP), radio link control (RLC), medium access control (MAC), and L1 (layer 1). L1 may also be referred to as a physical layer (PHY). At the gNB 402, facing the NR-Uu interface there are the following protocol layers: RRC, PDCP, RLC, MAC, and L1, while facing the NG-C interface there are the following protocol layers: NGAP (N2AP), stream control transmission protocol (SCTP), Internet protocol (IP), L2 (layer 2), and L1. At the AMF 403, facing the NG-C interface there are the flowing protocol layers: NAS, NGAP (N2AP), SCTP, IP, L2 and L1, while facing the NLs interface there are the following protocol layers: hypertext transfer protocol version 2 (HTTP/2), transport layer security/transmission control protocol (TLS/TCP), IP, L2, and L1. At the LMF 404, the protocol layering 400 includes the following protocol layers: LPP, HTTP/2, TLS/TCP, IP, L2, and L1.

As shown, under configuration of the centralized architecture, an LPP PDU can be transmitted from the UE 401 to the AMF 403 using NAS as transport, and transmitted from the AMF 403 to the LMF 404 using HTTP/2 as transport.

In case a distributed positioning architecture is employed where a DLF 405 is hosted at the gNB 402, transmission of an LPP PDU from the UE 401 to the DLF 405 can be performed as follows. The LPP PDU can first be delivered to AMF 403 using NAS as transport. From the AMF 403 to the DLF 405, the LPP PDU can use NGAP (N2AP) as transport. In addition, an LPP PDU from the DLF 405 to the UE 401 can use RRC as transport.

Figure 5:
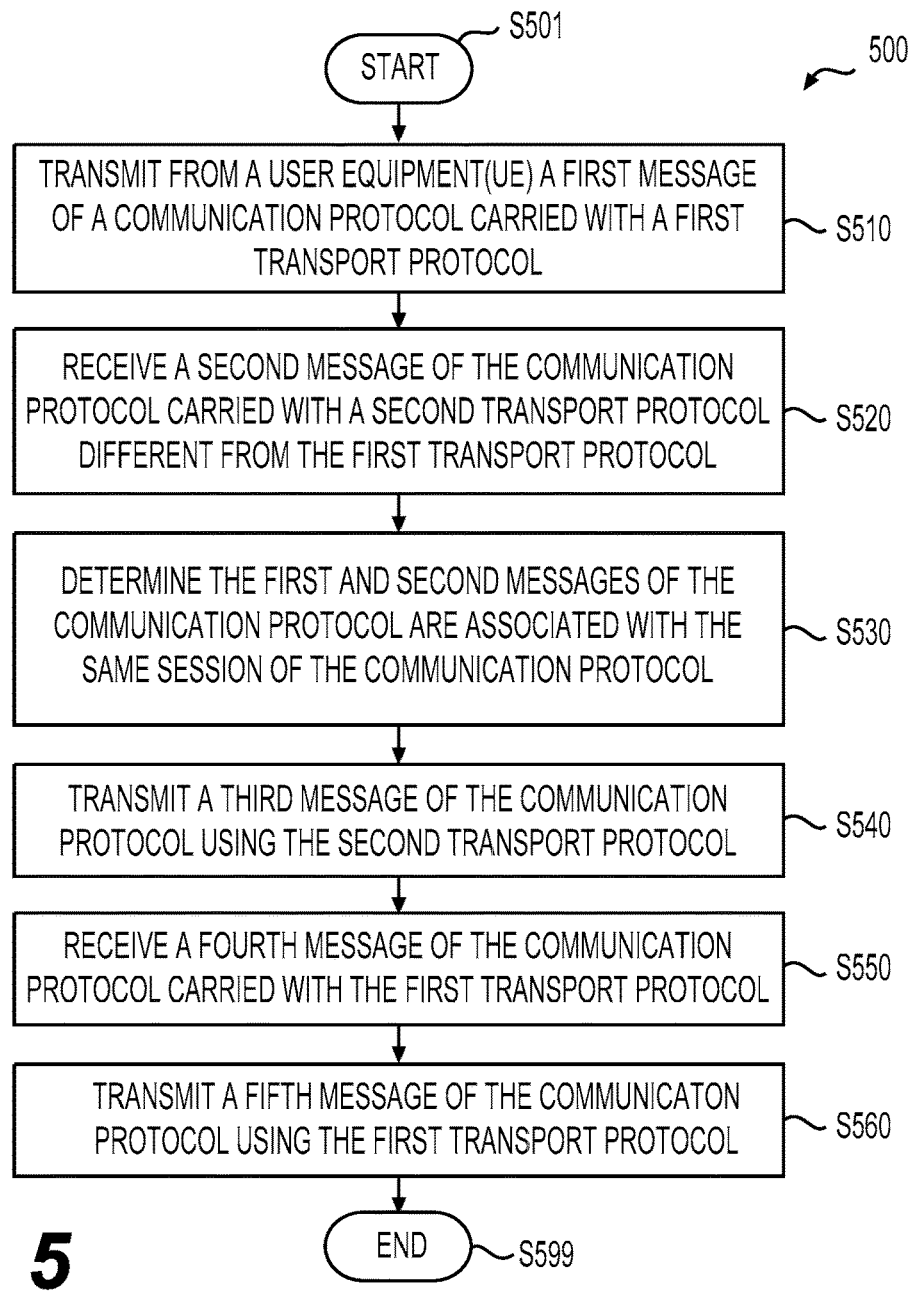
FIG. 5 shows a flow chart of a positioning process 500 based on a distributed positioning architecture.

FIG. 5 shows a flow chart of a positioning process 500 based on a distributed positioning architecture. The process 500 can be performed at a UE during a positioning session, for example, based on an LPP. The process 500 starts from S501 and proceeds to S510.

At S510, the UE transmits a first message of a communication protocol (e.g., an LPP) carried using a first transport protocol. For example, the first transport protocol is an NAS protocol between the UE and a core network element (e.g., an AMF).

At S520, the UE receives a second message of the communication protocol carried with a second transport protocol. For example, the second transport protocol is an RRC protocol between the UE and a DLF (a location server) hosted at a base station (e.g., a gNB). The DLF receives the first message of the communication protocol forwarded by the core network element, and accordingly transmits the second message of the communication protocol to the UE.

At S530, the UE determines that the first and second message of the communication protocol are associated with a same session of the communication protocol. In one example, the first message and the second message of the communication protocol include a same transaction identifier (ID). In another example, a first transport message of the first transport protocol (e.g., a UL NAS TRANSPORT message) carries the first message, and a second transport message of the second transport protocol (e.g., an RRC DLInformationTransfer message) carries the second message of the communication protocol. The first and second transport message each carry information (e.g., a routing ID or session ID) indicating a same session of the communication protocol. For example, the UE can determine the first and second message of the communication protocol are associated with the same session of the communication protocol based on the above transaction ID, or routing ID/session ID.

At S540, the UE can transmit a third message of the communication protocol using the second transport protocol. For example, the third message of the communication protocol is associated with the same session of the communication protocol as the first and second messages of the communication protocol.

At S550, the UE receives a fourth message of the communication protocol carried with the first transport protocol. For example, the third message of the communication protocol is transmitted to the DLF at the base station. The DLF may determine that an LMF in a core network is suitable for processing the third message of the communication protocol and thus forward the third message of the communication protocol to the LMF. The LMF may subsequently transmit the fourth message of the communication protocol to the UE carried using the first transport protocol.

At S560, the UE can transport a fifth message of the communication protocol using the first transport protocol in response to receiving the fourth message of the communication protocol. For example, based on a transaction ID carried in the fourth message, or a routing ID in a transport message carrying the fourth message, the UE may recognize the fourth message is associated with the same session as the first message of the communication protocol, and the underlying transport has switched back to the first transport protocol from the second transport protocol. Subsequently, the first transport protocol is used for delivery of the fifth message of the communication protocol. The process 500 proceeds to S599, and terminates at S599.

Figure 6:
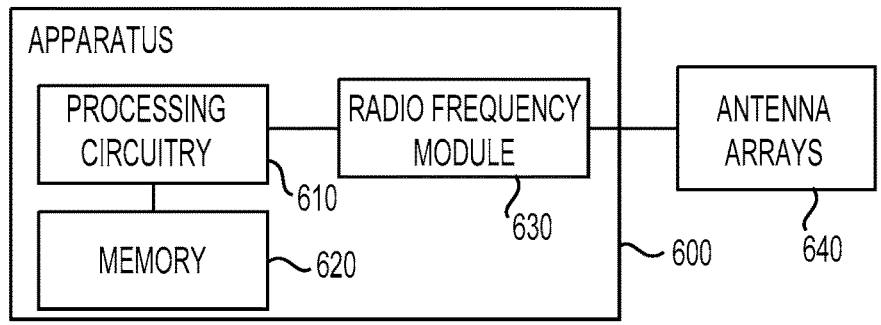
FIG. 6 shows an exemplary apparatus 600 according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of mechanisms, techniques, processes, functions, components, systems described herein. For example, the apparatus 600 can be used to implement functions of UEs, base stations, network functions (e.g., AMF, LMF, DLF, and the like) in various embodiments and examples described herein. The apparatus 600 can include a general purpose processor or specially designed circuits to implement various functions, components, or processes described herein in various embodiments. The apparatus 600 can include processing circuitry 610, a memory 620, and optionally a radio frequency (RF) module 630.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable devices or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include non-transitory storage media, such as a read only memory (ROM), a random access memory (RAM), a flash memory, a solid state memory, a hard disk drive, an optical disk drive, and the like.

In some embodiments, the apparatus 600 can additionally include the RF module 630 to implement a UE or a base station. The RF module 630 can be configured to receive a processed data signal from the processing circuitry 610 and converts the data signal to beamforming wireless signals that are then transmitted via antenna arrays 640, or vice versa. The RF module 630 can include a digital to analog converter (DAC), an analog to digital converter (ADC), a frequency up converter, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   transmitting from a user equipment (UE) a first message of a communication protocol carried with a first transport protocol;
   receiving by the UE a second message of the communication protocol carried with a second transport protocol different from the first transport protocol;
   recognizing by UE that an underlying transport protocol for carrying messages of the communication protocol has switched from the first transport protocol to the second transport protocol in response to determining by the UE that the first and second messages of the communication protocol are associated with a same session of the communication protocol;
   transmitting by the UE a third message of the communication protocol using the second transport protocol;
   receiving by the UE a fourth message of the communication protocol carried with the first transport protocol; and
   transmitting by the UE a fifth message of the communication protocol carried with the first transport protocol in response to recognizing that the underlying transport protocol has switched back from the second transport protocol to the first transport protocol,
   wherein a same routing identifier (ID) is contained in or associated with the first, second, third, fourth and fifth messages.

2. The method of claim 1, wherein the transmitting includes transmitting the first message of the communication protocol to a base station, and wherein the receiving includes receiving the second message of the communication protocol from the base station.

3. The method of claim 1, wherein the third message of the communication protocol is associated with the same session of the communication protocol as the first and second messages of the communication protocol.

4. The method of claim 1, wherein the first message and the second message of the communication protocol include a same transaction identifier (ID).

5. The method of claim 1, wherein a message of the first transport protocol carrying the first message and a message of the second transport protocol carrying the second message of the communication protocol each carry information indicating the same session of the communication protocol.

6. The method of claim 1, wherein the first transport protocol is a non-access-stratum (NAS) protocol between the UE and a core network element, and the second transport protocol is a radio resource control (RRC) protocol between the UE and a base station.

7. The method of claim 1, wherein the communication protocol is a positioning protocol between the UE and a location server.

8. The method of claim 1, further comprising:
   receiving by the UE a fourth message of the communication protocol carried with the first transport protocol; and
   transmitting by the UE a fifth message of the communication protocol using the first transport protocol.

9. An apparatus, comprising circuitry configured to:
   transmit a first message of a communication protocol carried with a first transport protocol;
   receive a second message of the communication protocol carried with a second transport protocol different from the first transport protocol;
   recognize that an underlying transport protocol for carrying messages of the communication protocol has switched from the first transport protocol to the second transport protocol in response to determining that the first and second messages of the communication protocol are associated with a same session of the communication protocol;
   transmit a third message of the communication protocol using the second transport protocol;
   receive a fourth message of the communication protocol carried with the first transport protocol; and
   transmit a fifth message of the communication protocol carried with the first transport protocol in response to recognizing that the underlying transport protocol has switched back from the second transport protocol to the first transport protocol,
   wherein a same routing identifier (ID) is contained in or associated with the first, second, third, fourth and fifth messages.

10. The apparatus of claim 9, wherein the transmitting includes transmitting the first message of the communication protocol to a base station, and wherein the receiving includes receiving the second message of the communication protocol from the base station.

11. The apparatus of claim 9, wherein the third message of the communication protocol is associated with the same session of the communication protocol as the first and second messages of the communication protocol.

12. The apparatus of claim 9, wherein the first message and the second message of the communication protocol include a same transaction identifier (ID).

13. The apparatus of claim 9, wherein a message of the first transport protocol carrying the first message and a message of the second transport protocol carrying the second message of the communication protocol each carry information indicating the same session of the communication protocol.

14. The apparatus of claim 9, wherein the first transport protocol is a non-access-stratum (NAS) protocol between the apparatus and a core network element, and the second transport protocol is a radio resource control (RRC) protocol between the apparatus and a base station.

15. The apparatus of claim 9, wherein the communication protocol is a positioning protocol between the apparatus and a location server.

* * * * *